Mar. 3, 1925.
C. J. GAMBEL
1,528,371
METHOD OF MAKING DECOLORIZING CARBONS
Original Filed May 13, 1922    7 Sheets-Sheet 1
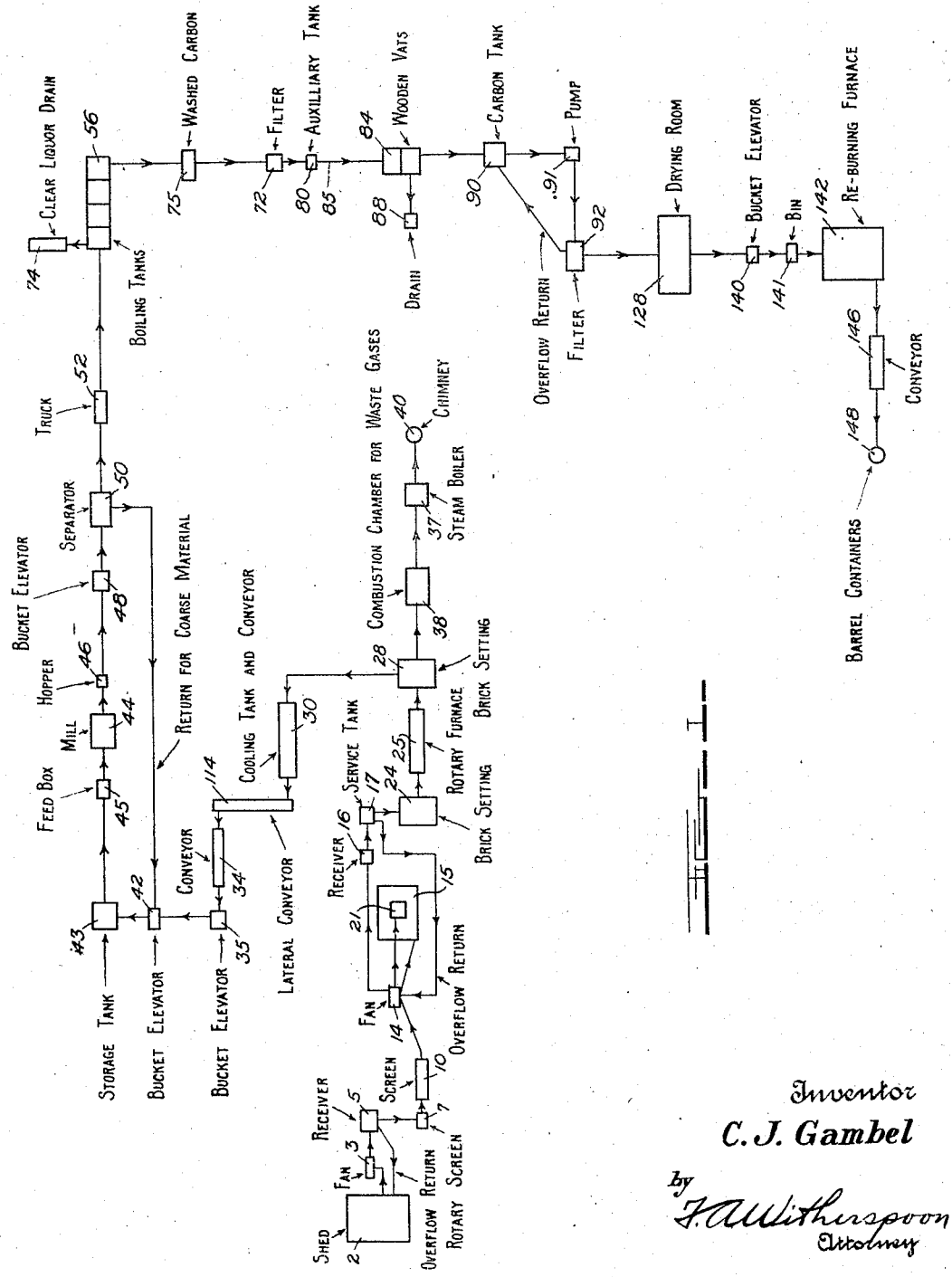
Inventor
C. J. Gambel
by
F. A. Witherspoon
Attorney

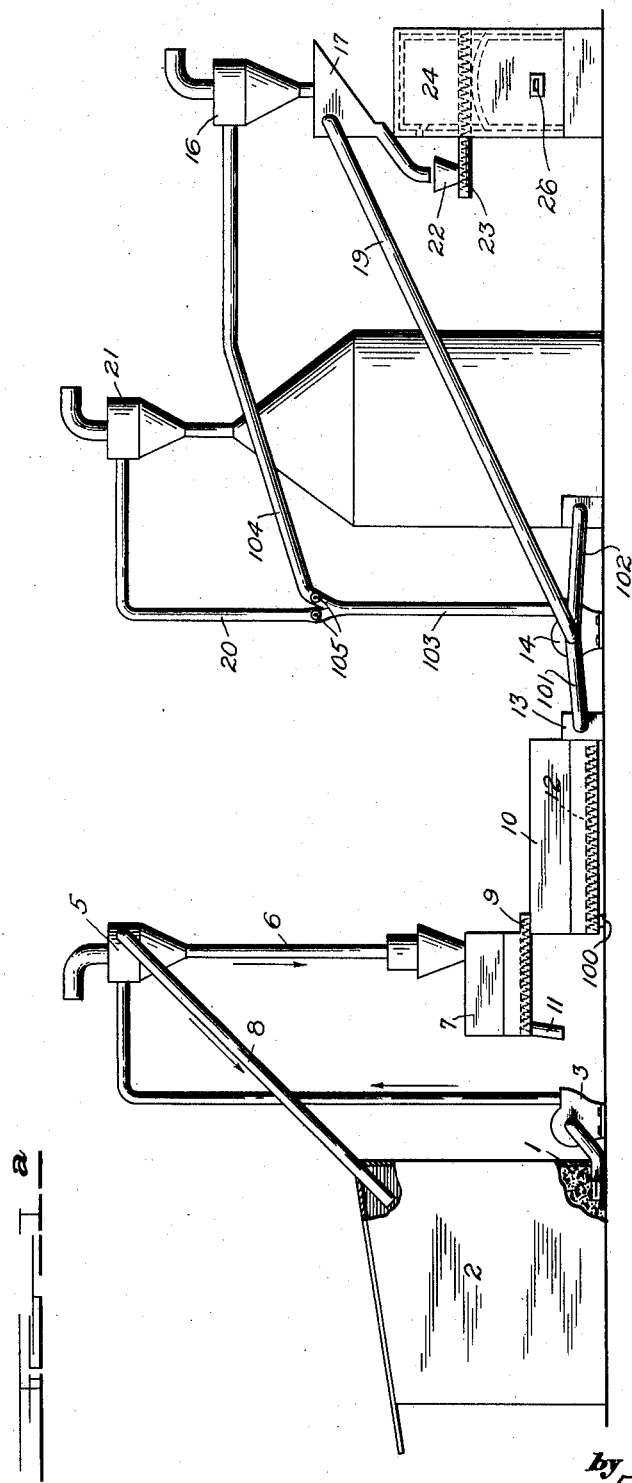

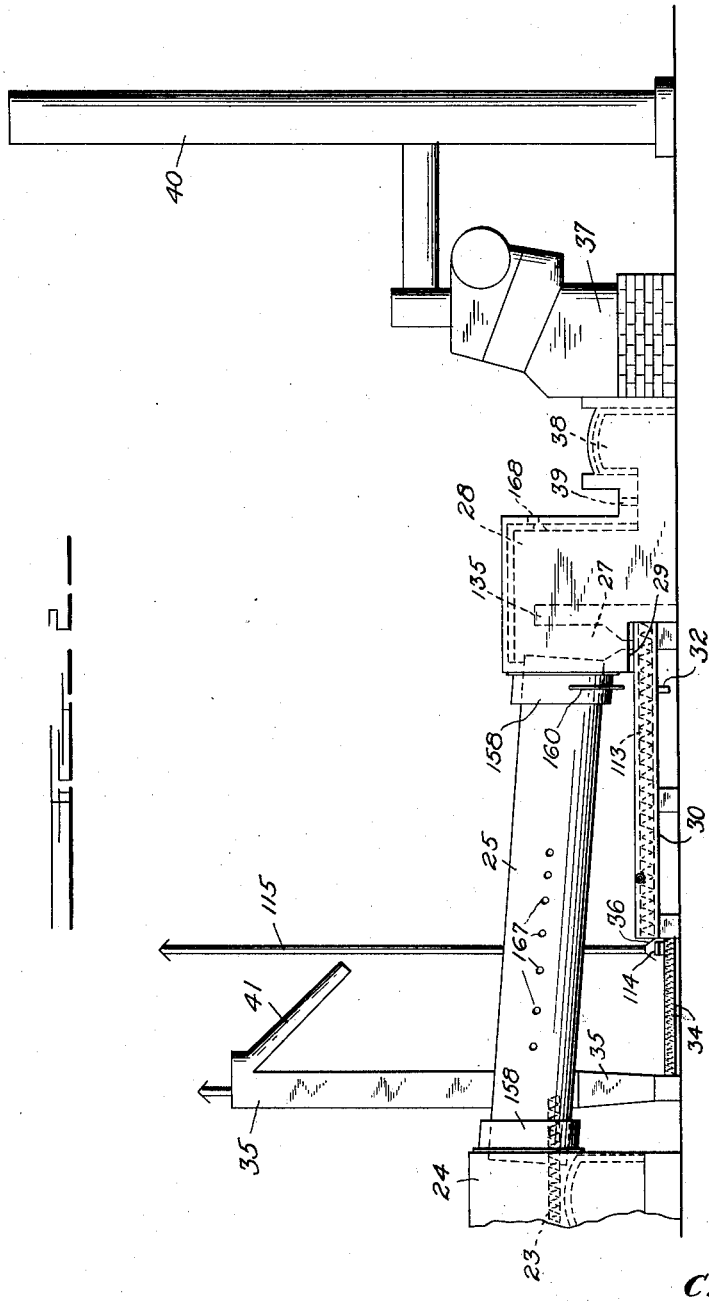

Mar. 3, 1925.
C. J. GAMBEL
1,528,371
METHOD OF MAKING DECOLORIZING CARBONS
Original Filed May 13, 1922    7 Sheets-Sheet 4
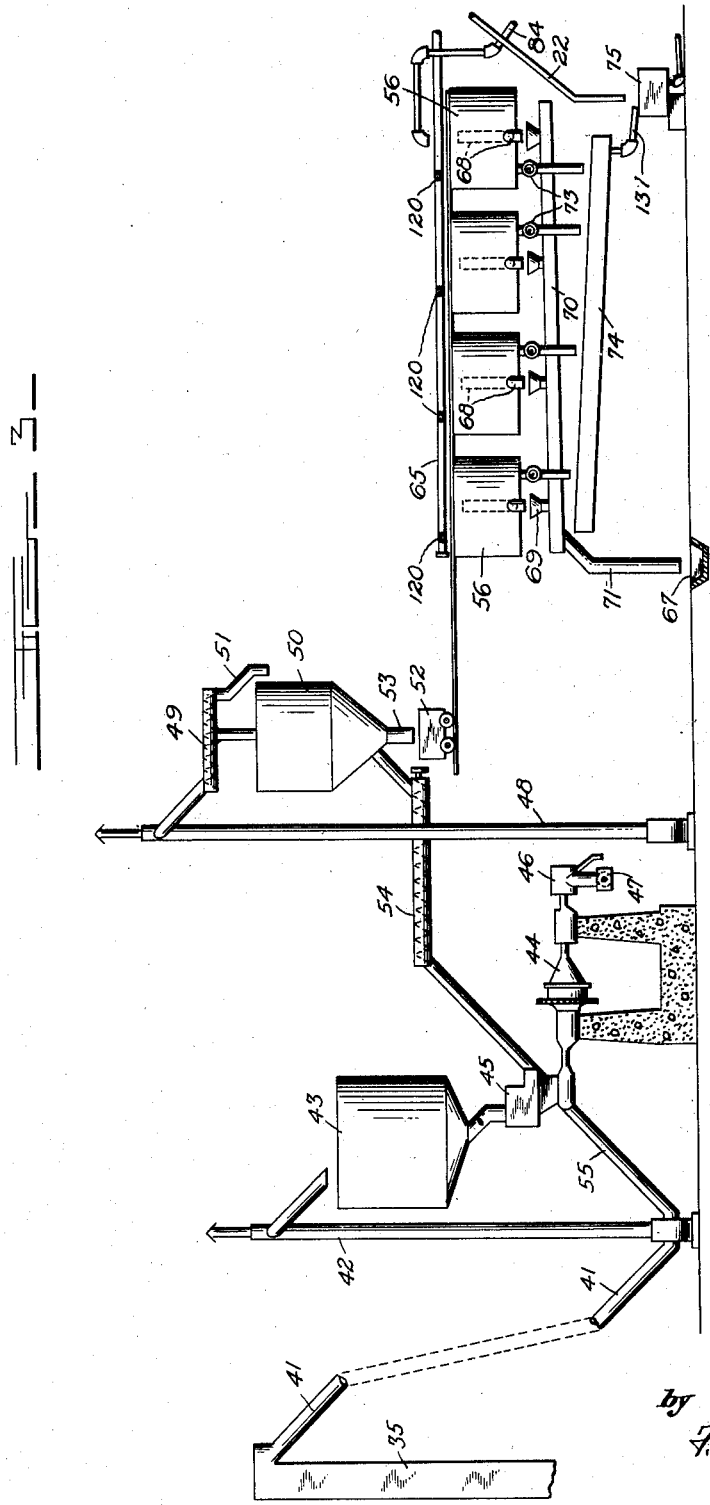
Inventor
C. J. Gambel
by
F. A. Witherspoon
Attorney Mar. 3, 1925.  
C. J. GAMBEL  
1,528,371  
METHOD OF MAKING DECOLORIZING CARBONS  
Original Filed May 13, 1922 7 Sheets-Sheet 5
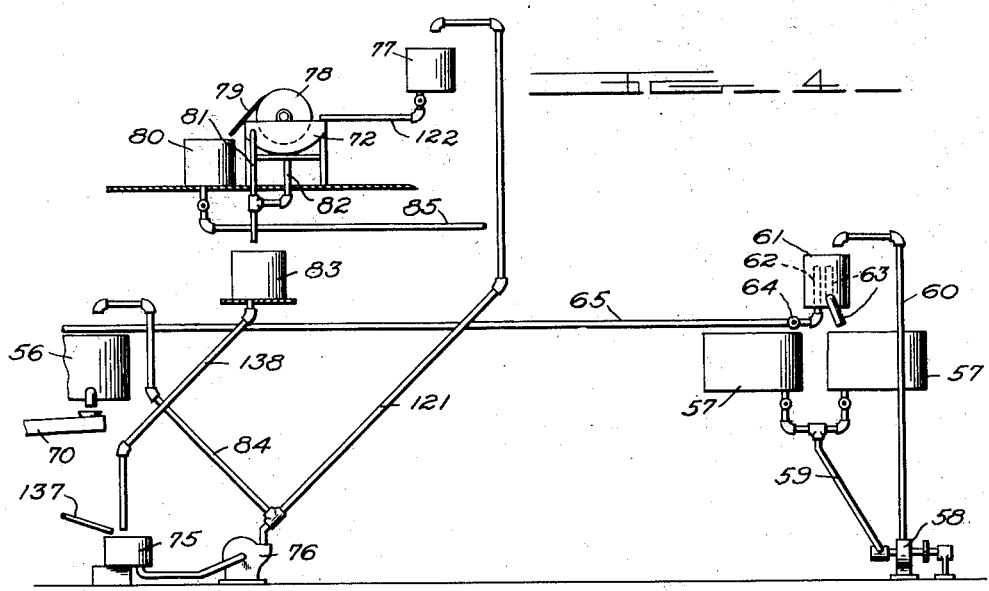
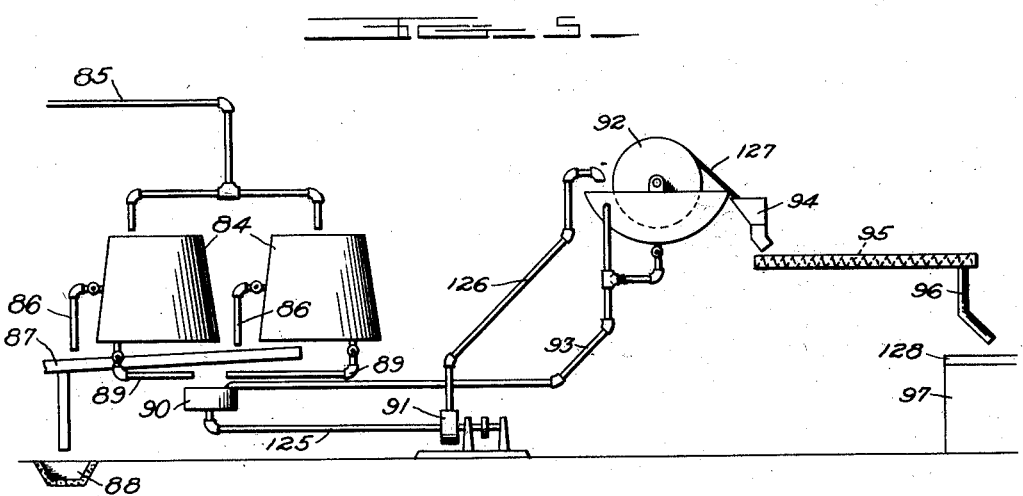
Inventor  
C. J. Gambel  
by  
F. A. Witherspoon  
Attorney

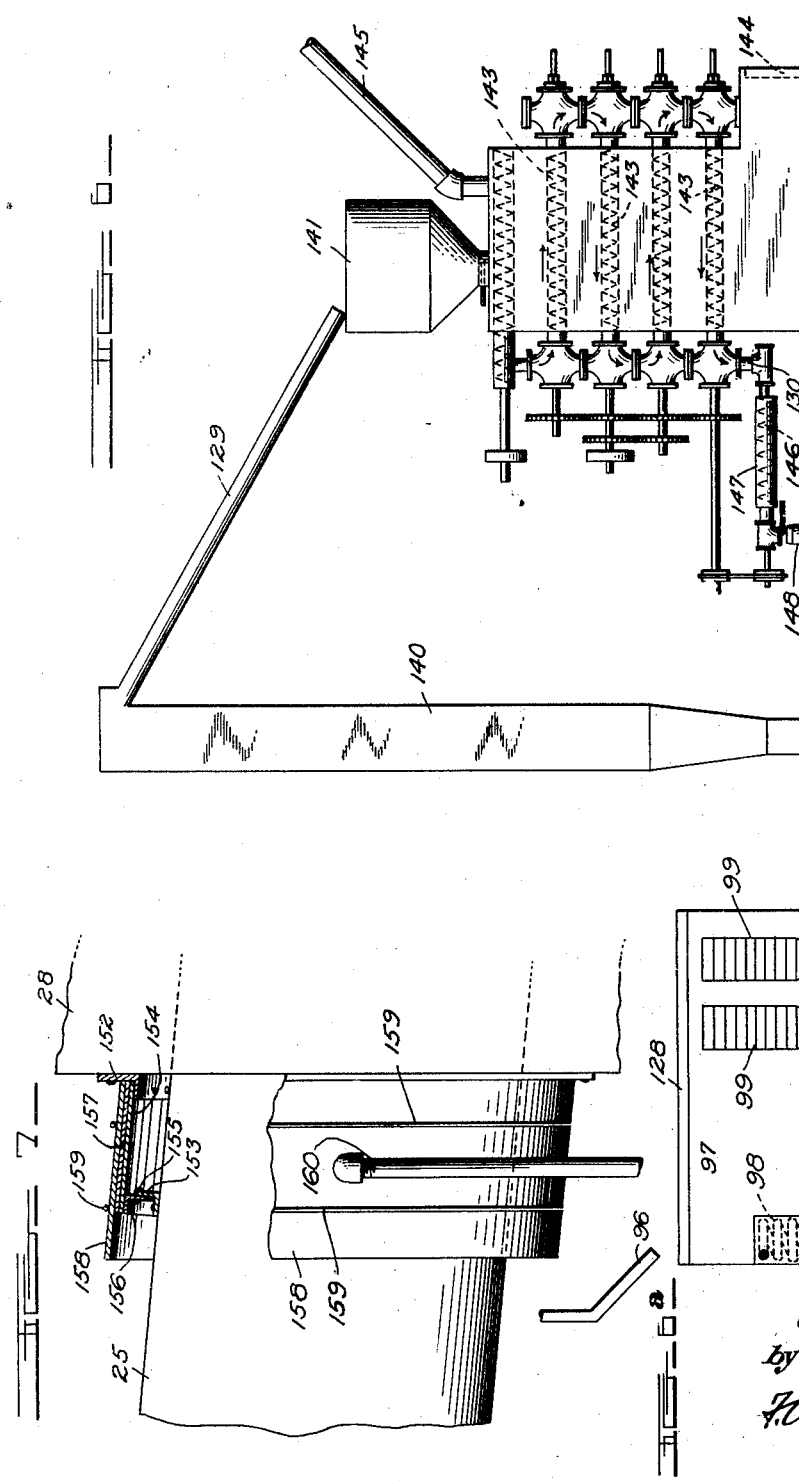

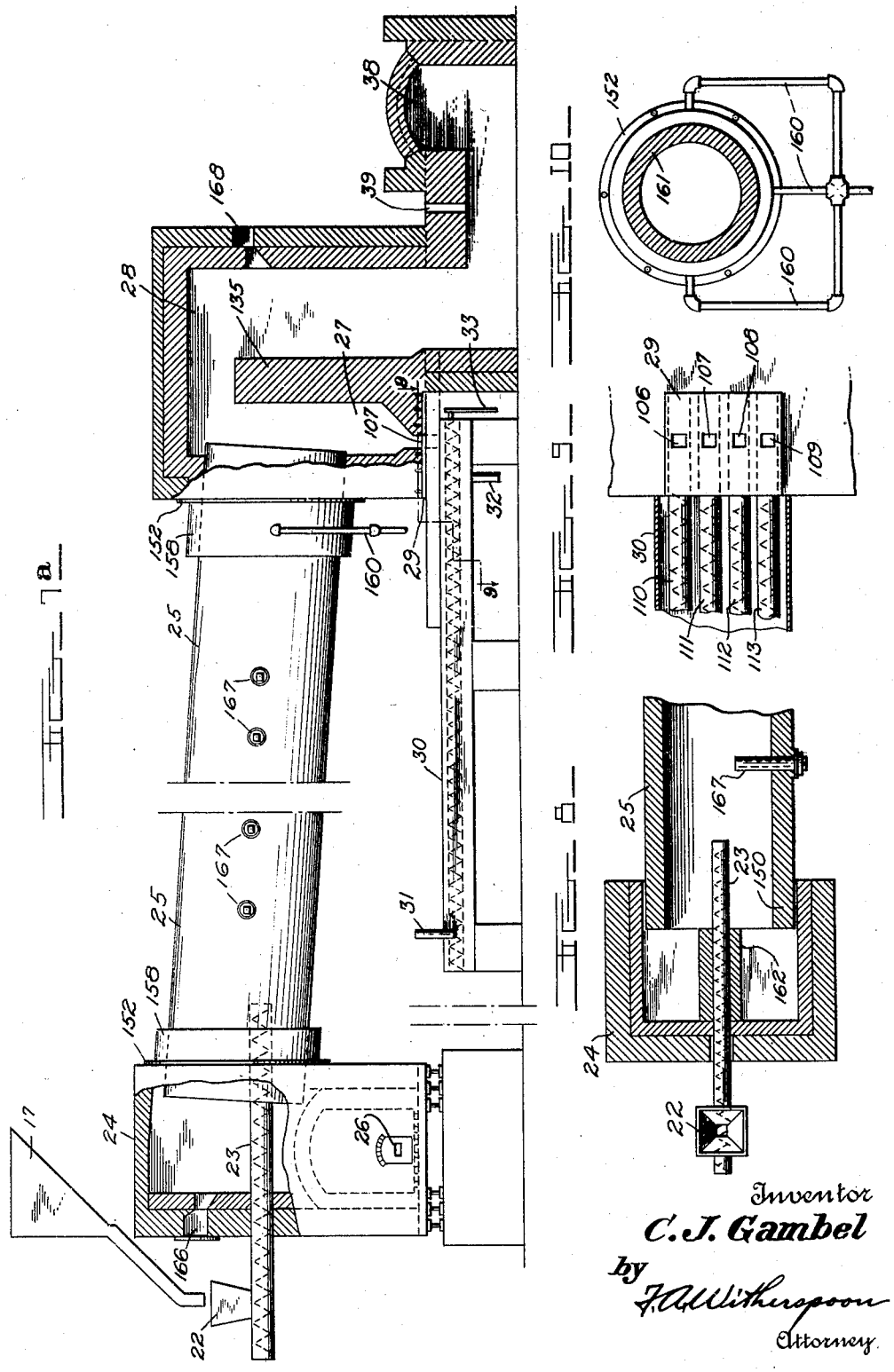

Patented Mar. 3, 1925.

1,528,371

UNITED STATES PATENT OFFICE.

CHRISTIAN J. GAMBEL, OF NEW ORLEANS, LOUISIANA.

METHOD OF MAKING DECOLORIZING CARBONS.

Original application filed May 13, 1922, Serial No. 560,780. Divided and this application filed October 20, 1923. Serial No. 669,839.

*To all whom it may concern:*

Be it known that I, CHRISTIAN J. GAMBEL, a citizen of the United States, residing at New Orleans, in the parish of Orleans and State of Louisiana, have invented certain new and useful Improvements in Methods of Making Decolorizing Carbons; and I do hereby declare the following to be a full, clear, and exact description of the invention, such as will enable others skilled in the art to which it appertains to make and use the same.

This invention relates to a method of making decolorizing carbons from fibrous rice material, and has for its object to improve the procedures which have been heretofore prepared.

With these and other objects in view, the invention consists in the novel steps and combinations of steps constituting the process, all as will be more fully hereinafter disclosed and particularly pointed out in the claims.

This is a division of my copending application filed May 13, 1922, Serial No. 560,780, entitled Method of and Apparatus for Making Decolorizing Carbons.

Referring to the accompanying drawings forming a part of this specification, in which like numerals designate like parts in all the views:

Figure 1 is a diagram illustrating the relations of the various mechanisms employed in producing the finished product;

Figure 1ª is an elevational view partially in section, of means for storing and moving the rice hulls to the furnace;

Figure 2 is an elevational view of a portion of the furnace for carbonizing the fibrous rice material;

Figure 3 is an elevational view of the means for transporting the carbonized material from the bucket elevator to the grinding mill and caustic soda tanks;

Figure 4 is a view of the means for transporting the washed carbon from the caustic soda tanks to the acid tanks;

Figure 5 is a view of the means for treating the carbon with acid, washing and filtering the same;

Figure 6 is a view of the carbon reheating furnace;

Figure 6ª is a diagrammatic view of the drying room for the carbon;

Figure 7 is an enlarged detail view of the connection between the drum 25 and brick work 28;

Figure 7ª is an enlarged partially sectional view of said drum 25 and heater 24, and brick work 28, and associated parts;

Figure 8 is a sectional view of the receiving end of the drum 25 and heater 24;

Figure 9 is a detail plan view of the plurality of conveyers receiving the material from the drum 25; and Figure 10 is a cross sectional view of said drum 25, looking in the direction of the brick work 28.

In order that the precise invention may be the more clearly understood, it is said: It is now well known that if rice hulls and other fibrous rice materials are carbonized out of contact with the air, and then boiled in caustic soda until a material proportion of their silica content is dissolved out, the resulting carbon will, when finely ground, possess a decolorizing power for sugar and other liquors which is many times that of bone black. But in manufacturing this carbon on a large scale many almost insuperable difficulties have been encountered. In the first place, rice hulls, the most desirable material, are individually very light, they are blown about like chaff, and it has been found a very serious problem to find a furnace which will thoroughly carbonize them and will, yet not consume so much of the carbon present, as to destroy their usefulness. That is, if too much air is admitted to the furnace, the rice hulls being very easily consumed, will be partially or wholly destroyed for the purpose in hand, and if too little air is admitted, it is found very difficult to maintain such a temperature in a furnace of the required size as will uniformly and thoroughly carbonize the said hulls on a large scale, although it is a simple matter to do this on a small scale. Further, when the air entering a furnace of a commercial size has been adjusted for one car load of hulls, it may be found to operate very inefficiently for the next car load, owing to the difference in the moisture present. That is, if the heat given off by the combustion of the first dry car load is just right to maintain the proper carbonizing temperature, a car load having a larger moisture content will burn at a temperature too low for a successful carbonization.

The above and numerous other difficulties not necessary to mention have had to be overcome, and has cost many thousands of dollars before the process and apparatus now to be disclosed was arrived at.

In carrying out the present invention, the rice hulls 1 are brought from the rice mills and preferably stored in the shed 2, whence they are drawn by the suction fan 3 and blown through pipe 4 into the dust collector or receiver 5, and thence they pass through pipe 6 into the rotary screen 7. The receiver 5 is provided with an overflow pipe 8 to prevent the hulls from piling up in said receiver 5. In the screen 7, which may be of any suitable and well known construction, the hulls are separated from the coarse trash which is thrown out through the chute 11 to the ground, and said separated or partially charred hulls are passed on to the screw conveyer 9, which feeds them into a second screen 10, which deprives the partially cleaned hulls of any fine waste screenings, dust, etc., which may be present after the first screening action. These waste screenings, dust, etc., are passed through the chute 100 to the ground, while the now cleaned hulls pass on to the screw conveyer 12. It should be remarked that in practice it has been found important to thus thoroughly separate the rice hulls from their accompanying foreign matter, for otherwise the resulting rice hull carbon will contain injurious amounts of other material which is not suitable for decolorizing purposes, and thus will its efficiency be lowered.

The screw conveyer 12 carries the cleaned hulls to the box 13, which is connected through one leg 101 of a Y fitting to a fan 14. The other leg 102 of said fitting connects said fan 14 with the bottom of a large storage tank 15. This disposition of parts enables the operator to draw by means of the suction fan 14 the screened rice hulls directly from either the box 13 or from the tank 15, and to blow said hulls through the pipes 103 and 104 to the receiver 16, whence they pass to the feed service tank 17. The pipe 103 is controlled by two valves 105 so that if desired the hulls may be by-passed through pipe 20 into receiver 21, whence they will pass down into the storage tank 15. The pipe 19 constitutes an overflow from tank 17 back to fan 14 to prevent an excess of hulls from collecting in said tank 17. In other words, it will be understood that in order to carbonize rice hulls within the narrow limits and under the exacting requirements of practice, it is necessary that the hulls be fed to the furnace continuously at a uniform rate, but when anything goes wrong and the furnace refuses to take its normal steady supply it is found to be equally necessary to provide the bypasses and overflows described to prevent the system from clogging.

From the service feed tank 17 the hulls pass on down to the funnel 22 and screw conveyer 23, which leads them into the drying or preheating end 24 of the carbonizing furnace. This preheating furnace 24 is a very important portion of the invention, in that it is maintained at a predetermined temperature by external firing and thus are all the hulls uniformly dried before carbonization takes place. That is to say, through the screening actions disclosed, the material to be carbonized is freed from foreign matter and brought to a uniform quality, through the overflow and bypass pipes a continuous supply of said purified material is brought to the preheater, or dryer 24; and through the action of said dryer 24 the moisture content of the rice hulls is made uniform. Each of these features has been found to be important toward a successful carrying out of the process.

The screw conveyer 23 projects a considerable distance (about 4 feet) into the mouth of a rotary kiln furnace 25, see Figure 2. This furnace is brick lined, is continuously rotated around its longer axis by any suitable means not shown, and in fact is or may be of the usual type of cement rotary kilns well known to those skilled in the art.

The main purpose of projecting the forward end of the screw conveyer 23 into the furnace drum 25 is to insure a forward motion of the hulls toward the front end of the furnace. That is, when the pile of hulls is dropped from the conveyer 23 too near to the elevator, or back end of the drum 25 of the furnace, there is a considerable tendency for the hulls to flow backward, and consequently, there results a leakage between the brickwork setting of the heater portion 24 and the said back end of the furnace proper. Heat, however, is continuously applied in the heater portion 24 of the furnace by any suitable means, such, for example, as an oil burner 26 mounted in the brick setting, and the hot combustion gases passing through this said heater portion 24 soon heat up the said brick work as well as the lining of the drum 25. When the temperature of said brickwork and of the furnace 25 has been raised to a sufficient point, as will be indicated by the electrical pyrometer couples placed at different positions of the system (but not shown), the hulls are gradually fed into the furnace 25 by the conveyer 23. The action now taking place at the back end of the furnace 25 is a continuation of the drying operation carried on in the heater 24, but it is found to be complete by the time the hulls are delivered into the furnace drum 25. After the moisture is completely eliminated from the hulls, a decomposition or a destructive distillation of the latter occurs, and the heat value of the combustible products when ignited is found to be sufficient to readily maintain the temperature of the furnace 25 at the required point to effect an efficient carbonization of the hulls without consuming the carbon thereof.

In other words, the main function of the oil burner 26 and heater 24 is to maintain the heating and feeding section of the furnace proper at a sufficiently high temperature to insure a quick drying of the hulls and a commencement of the destructive distillation process, and also to accomplish this result at a point in the drum 25 as far back as possible, so that a maximum yield of rice hull carbon will be obtained at the outlet from said drum 25, and also free from organic matter.

The char thus produced leaves the rotary furnace 25 by dropping under the action of gravity into a V-shaped cavity 27, Figures 2 and 7ª, provided at the extreme end of said furnace 25. Said V-shaped cavity is formed with the aid of a fire brick baffle wall 135 inside the brick setting 28 and at the bottom of said cavity 27 is an iron plate 29 with four rectangular openings 106, 107, 108, and 109, leading the char into four separate screw conveyers 110, 111, 112, and 113, respectively, all as will be clear from Figures 2, 7ª, and 9. The screws of the said conveyers 110, 111, 112, and 113 are enclosed in iron pipe casings, and the screws and pipe, or the complete conveyers themselves, are set in long cooling tanks 30, through which water may be constantly circulated by means of the pipes 31 and 32. These said conveyers are preferably separately driven with chains and sprockets only one of which is indicated at 33 in Figure 7ª, and they deliver onto the short cross screw conveyer 114, see Figures 1 and 2, which in turn carries it to another screw conveyer 34, whence the char is delivered into the boot like bucket elevator 35, all as will be clear from the drawings.

The carbon dust formed at the outlet of the cooling tank 30 is carried out of the furnace room through the hood 36 and pipe 115.

The waste gases leaving the brick chamber 28 pass into the flue of the steam boiler 37, by way of the combustion chamber 38. A slot 39 in the brick work permits of the passage of enough air into this combustion chamber to completely burn up all the volatile organic matters present. This burning of the organic products of the distillation material increases the temperature of the gases, and the heat thus derived is utilized in raising steam of the passage of the gases around the boiler tubes en route to the chimney stack 40.

The carbonized rice hulls leaves the bucket elevator 35 by way of the pipe 41, see Figures 2 and 3, leading into the boot of the bucket elevator 42 which carries it to a storage tank 43. From the storage tank 43 the rice hull carbon char passes to the ball mill 44 through a regulating feed box 45, and the ground material leaves the mill 44 by way of a hopper 46, which delivers it into a screw conveyer 47 and thence to the boot of the bucket elevator 48, see Figures 1 and 3. After leaving the bucket elevator 48 the ground carbon passes through the screw conveyer 49 and enters a suitable separator 50. 51 represents the overflow of the screw conveyer 49. The finely sifted carbon passes from the separator 50 into trucks 52, through its outlet 53 while the coarse particles of carbon drop onto the screw conveyer 54 and are returned to the elevator 42 through the pipe 55. The trucks are filled with the finely ground carbon, are wheeled opposite the boiling tanks 56, and the said carbon sluiced with water into said tanks 56, through the opening not shown, provided in the bottom of the said trucks 52.

Each boiling tank 56 holds a suitable charge of char; water is mixed with the char and a quantity of caustic soda added, representing a charge of about 20% of caustic soda on the weight of the dry char. Steam is blown into the tanks 56 by means not shown, and the mixture is boiled for a period of about three hours or until a very material proportion (say about 75% or more) of the silica present in the char has been removed.

As there is some practical difficulty in getting a satisfactory caustic soda solution for properly removing the silica in the char, it is said: The caustic soda is brought to the plant in steel drums and the caustic liquor is made in the tanks 57, Figure 4, after lowering a number of these drums with their ends removed into the tanks and filling up the latter to a definite level with water. To insure an even composition of the liquor before use, the said liquor is circulated by a pump 58. That is, the said liquor is drawn from the bottoms of the tanks 57 through the pipe 59, and returned to the same tanks by way of pipe 60, and the small measuring tank 61. The said tank 61 overflows through the leveling pipe 62, and swivel pipe 63, which latter can be slung over to either tank 57, at will, when it is desired to fill the same.

When a charge of caustic liquor is to be run to any of the carbon boiling tanks 56, Figure 3, the leveling pipe 62 is set at such a level in the measuring tank 61 as to provide the required amount of caustic soda. The said measuring tank 62 being filled with caustic liquor by means of the pump 58, it is kept filled therewith so long as any liquor is needed in the tanks 56. On the other hand, the overflow from said tank 61 is constantly passed back into the tanks 57, as will be readily understood.

65 represents a pipe to convey the liquor from the tank 61 to the tanks 56, and 64 is a valve controlling said pipe 65. 120 represents additional controlling valves with which the pipe 65 is provided and which govern the admission of caustic liquor in to each particular tank 56.

When the ground char has thus been boiled for a period depending on the strength of the solution in the tanks 56, and until all of the silica except from, say, 5% to 15% has been removed from the said char, it is found that said silica has been to a large extent converted into silicate of soda, and the carbon mixture may now be diluted with boiling water and the carbon allowed to settle. After some hours of settling, the clear liquor is carefully siphoned off to the level of the settled carbon, and it may be passed into a suitable storage receptacle, not shown, for recovery of the sodium silicate or for its future treatment, or it may be passed directly into a drain or sewer 67. This latter is conveniently effected by suitably manipulating the delivery pipes 68 with which each tank 56 is provided, and allowing the sodium silicate to flow into the funnels 69 leading to the chute 70, and drain pipe 71 emptying into the drain 67.

The washing, settling, and decanting steps are carried out several times in the tanks 56, in order to get rid of all the alkali possible, from the carbon, after which the said carbon is found to be sufficiently free from caustic soda and silicate of soda to be handled in suitable filters, such, for example, as the well known Oliver type of filter 72, see Figure 4.

One or more of the valves 73 controlling the outlet of the tanks 56 are now opened, and washed carbon in the bottom of said tanks is run into the chute 74, and thence to the box 75 through the outlet 137, see Figures 3 and 4. From the box 75 the washed carbon is drawn by the pump 76 and forced into tank 77 through the pipe 121. The said tank 77 supplies the filter 75 preferably of the Oliver type through the pipe 122, and the filtered carbon is separated from the filter cloth on the slowly rotating drum 78, by means of the scraper 79, whence it flows into tank 80, where it is mechanically agitated with water. From the tank 80 the said material passes into pipe 85 presently to be described. The pipe 81 attached to the filter tanks 72 prevents overflowing of the same, and leads to tank 83, having the connection 138 to the box 75. The tank 83 also takes the drainings from the Oliver filter tanks 72 by means of the pipes 82 leading from the bottoms of said tanks.

It thus results that the contents of these said tanks 72 can be pumped from the tank 83 to the box 75 back into said tank 72 when desired. On the delivery side of the pump 76 there is also connected a pipe 84 which provides means for pumping back to the caustic boiling tanks 56 the washed carbon if for any reason it is found desirable to do so, as for example, when it is found that not sufficient silica has been removed from said carbons and it is desired to reboil the same in caustic.

The carbon having been passed through the Oliver filter drum 78 and dropped into tank 80 and agitated with water, it is next passed through the pipe 85 into the wooden vats 84, see Figure 5, where it is rendered slightly acid by boiling with acid, preferably hydrochloric, and allowed to settle. The clear liquor is drawn off through pipe 86 into chute 87, and thence into the drain 88. The carbon in the vats 84 is now washed with further additions of boiling water, settled, and the clear liquor again decanted off. The acidified and washed carbon is next passed through pipes 89 into tank 90. This tank is connected by the pipe 125 to the pump 91, and by means of the latter, and of pipe 126, the carbon is transferred to another Oliver continuous filter 92. This filter is of a wooden construction, in order that it may not be attacked by the acid material. The overflow drained material from this filter can be returned to tank 90 through pipe 93. The carbon leaving the slowly rotating drum of said filter 92 passes over the scraper 127 into the hopper 94, whence it passes along the screw conveyer 95 and is dumped through chute 96 to a lower floor 128, adjacent to a drying room 97. This drying room, see Figure 6ª, is constructed of wood and lined inside with sheet iron. It is conveniently heated by the steam coil 98. Two sets of tiers of wooden trays 99 are illustrated, but of course more sets may be provided if desired. Each tray holds a quantity of carbon to be dried. After being subjected to this drying action until all the volatile matter has been eliminated, the dry carbon is then transferred by hand or otherwise to the bucket elevator 140 located adjacent said room 97, and this said elevator carries the carbon through the pipe 129 to the storage bin 141, which in turn feeds it to a reburning furnace 142. It is preferred to use any suitable type of automatic feeder, not shown, to transfer the material from the tank 141 to the furnace 142. This said furnace 142 consists of the series of pipes 143 horizontally placed one above the other inside of a brick setting and each pipe is provided with a screw conveyer operating alternately in opposite directions, as indicated by the arrows in Figure 6. The furnace is heated by any suitable means through the front portion 144, and the hot products of combustion passing upward around the outside of the pipes 143 finally pass out at the top of the furnace through the stack 145. The heated or reburned carbon leaves the furnace through the pipe 130, and screw conveyer 146, which is surrounded by the cooling tank or pipe 147, kept cool by a current of cold water. The cooled and reheated carbon subsequently drops into barrel 148 at the end of the screw conveyer 146, and is then ready for packing and shipping.

This reburning process is found in practice to be necessary to eliminate the final traces of the free acid which is included in the pores of the carbon and which can not be removed by the more simple process of washing with boiling water. Of course, it is very desirable that the carbon be entirely free from acid when it is to be used on sugar solutions. In other words, carbon of this character when washed until the water extract shows no acid reactions to methyl-orange is not necessarily acid free, for on a subsequent heating of said carbon, quantities of acid vapors are evolved. It is therefore very important in preparing decolorizing carbons of this character for use on sugar solutions that it be given this final heat treatment.

As stated above, it is very important indeed that too much air be excluded from the rotating drum 25 of the carbonizing furnace, for otherwise a large percentage of the useful carbon in the rice hulls will be burned up and lost. In other words, it is essential that the organic material in said hulls such as the resinous matters, be driven off, and that the cellulosic content be carbonized as thoroughly as possible without losing any of said last mentioned material which is so valuable as a decloroizing agent.

To do this, as intimated above, is a very very difficult problem to solve, because either too low a temperature will be used in which case the resinous materials will not be properly driven off, or too high a temperature will be used which in the presence of air will burn up the carbon.

Now, further, in obtaining a large tonnage of the carbonized rice hulls, it is necessary to employ large sized furnaces, and when they are of the rotary type such as is illustrated in this case, an undue leakage of air is sure to occur around the ends 150 and 151 of said furnaces where they rotate in the adjacent brick work setting. That is, since the interior of these furnaces are at a carbonizing temperature, there is a considerable expansion and contraction to be dealt with, and yet the loose fit thus required cannot be permitted to let air leak into the furnace.

In order to avoid the objections which would occur due to the leakage of air under the circumstances stated, I provide at each end of the furnace on the brick work 24 and 28, circular angle irons 152, see Figure 7. I further secure to each end 150 and 151 of the furnace, the similar angle irons 153; to the angle irons 152, I rivet at one end the sheets or plates 154, and to the angle irons 153 I rivet the small angle irons 155, having a flange 156 which is overlapped by the plates 154 at each end of the drum 25. Outside of the plates 154 I next provide layers of fire felt, asbestos material 157, and outside of the fire felt layers 157 I provide the sheet iron 158 and bind the whole together, as by the wires 159. The arrangement is such, as will be clear from Figures 7 and 7$^a$, that the drum 25 may freely rotate in its brick settings 24 and 28, and yet no air to speak of will enter through the joints.

160 represents exhaust steam pipes which, as best illustrated in Figure 10, are led through the joint above mentioned, at the end 151 of the furnace, in three places. The steam at the delivery end of the furnace serves to keep the joint connection there relatively cool, and thus prevents the excessive expansion of the drum and aids in preventing the brick lining 161 of the drum from coming loose.

It is further found desirable in order to prevent air leakage into the furnace to pass the screw conveyer 23 through the pipe like formation of the arch 162, see Figure 8, which not only serves to prevent air leaking into the furnace at the end 150 thereof, but also serves to retain a considerable amount of heat and, thus to render the temperature to which the hulls are subjected in the conveyer 23 more uniform than would otherwise be the case. A peep hole 166 is provided in the brick work 24 through which the operations of the furnace may be watched, and the cover for which being adjustable can also be used to a limited extent to admit air in the furnace when it is needed. 167 represents a plurality of pipes open at both ends which are fitted through the shell and lining of the rotary furnace 25. These open ended pipes, as best illustrated in Figures 7$^a$ and 8, project inside the drum 25 almost to its center, while the outside ends are fitted with various sized bushings and plugs. The function of these pipes is to regulate the supply of air entering the furnace and consequently to control the temperature of the furnace as well as the amount of combustion which takes place therein. In other words, very little carbonic acid gas, $CO_2$ should exist in the furnace 25, and yet a sufficient amount of CO should be formed to maintain the temperature just right for a perfect carbonization of the rice hulls on a large scale. Accordingly, the regulation of the air admitted to the furnace by means of these members 167 enables the operator when they are once adjusted to burn the carbon to a uniform degree, provided, of course, the rice hulls are uniform as to their purity, as to their moisture content, etc., as provided for above. 168 represents a peep hole in the brick work 28 in order that the color of the flame, and therefore the amount of $CO_2$ being produced may be readily judged at any time. When it is observed that the flame is about right, additional air may be readily admitted by regulating the cover, not shown, of the opening 39, see Figure 7$^a$, and thus permitting the CO gases present to ignite. If for any reason it is desired to shut down the furnace 25, a damper plate, not shown, may be inserted in the slot 39, and thus cut off the rotary furnace flue from the flue to the steam boiler, and at the same time prevent the passage of an excess of cold air into the boiler system.

From the foregoing, it will now be clear that in practicing this invention, I first separate out from the hulls the trash, fine dust, and other impurities which do not form good decolorizing material, and I next deprive the cleaned hulls of their moisture content, so that they may be uniformly carbonized in the rotary furnace 25.

I would call especial attention to the fact that it is a very difficult matter indeed to get a furnace sufficiently large to carbonize ton lots of rice material and yet not burn up the valuable carbon derived from the cellulose of said material. After the most costly experiments extending over many months, the best furnace I have been able to find is one of the rotary type illustrated. But even this furnace has to be modified as indicated above, before it will produce a satisfactory carbonization of the hulls.

It will further be seen that it is important that after the hulls are uniformly dried so that they will be uniformly carbonized in the furnace 25, a substantially predetermined uniform quantity of the hulls should be continuously fed to the said furnace 25. This predetermined quantity is readily obtained by the screw conveyers and other mechanism illustrated. After the hulls have been thus uniformly carbonized through a destructive distillation without burning up their valuable cellulosic carbon, they should be ground not only to facilitate their subsequent treatment with caustic soda, but to render them more efficient in the process of decolorizing sugar solutions.

Now, the carbonized hulls or char as it comes out of the furnace is not only very hot but it is very light and fluffy, and consequently exceedingly difficult to handle. Therefore, the cooling apparatus and screw conveyers enclosed in iron pipe are provided to insure that this very light carbon is kept under control at all times. The same remarks apply to the ground carbon after it leaves the grinding mill. Some of it is in the form of a very fine dust while other portions thereof are too coarse to be satisfactory in practice. Consequently, the coarse particles are returned to the circulation as disclosed, and reground, while the finely ground carbon is carried on to the caustic soda tanks, in order to partially remove their silica content. It is a problem to not only get this very fine impalpable dust like carbon into the said tanks, but it is also a problem to get it thoroughly mixed with the caustic solution therein. It has been found that the most convenient way is by sluicing the finely divided carbon out of the trucks containing the same with water, and thus forcing it into the tanks. Wherever a thorough mixture between the finely divided carbon and the liquid is desired, agitators, not shown in the drawings, are provided.

It would seem to those not having had sufficient experience that a boiling of the finely divided carbon with caustic and washing of the same, and the treatment of acid would be sufficient to remove all the alkali from the carbon, and that a further washing after treatment with the acid would remove all of the acid. But costly experience has shown that such is not the case. It has been found not only desirable but almost essential to wash the finely divided carbon one or more times after treatment with caustic, to further wash the carbon after treatment with acid, and then to still further heat the carbon in order to drive off the last traces of acid, which seem to impregnate the very fine microscopic pores with which the finished carbon is provided.

That is to say, as is well known, it is very desirable that no acid decolorizing material be introduced into sugar solutions, and experience has shown that even when the carbon which has been simply washed after the acid treatment shows a neutral condition to chemical indicators, yet it does contain appreciable quantities of acid, nevertheless. On the other hand, the most efficient method I have found for getting rid of the last traces of acid is by means of what I term a "reburning process" or a reheating process, after the carbon has passed the caustic soda and acid tanks.

The finished carbon, after this reheating, is found to be very efficient in the decolorizing of sugar solutions and other liquids. That is to say, as is well known, bone black has been used for a long number of years for the making of refined white sugar. It is further well known that a decolorizing carbon called "Norit" is from ten to fifteen times as powerful in its decolorizing properties as is bone black, and that it is largely used in this country as a substitute for bone black. On the other hand, the decolorizing carbon produced as above disclosed is found to be much more powerful in its decolorizing power than is Norit, but as stated above, in order to maintain this high degree of efficiency, it is necessary that its manufacture be most carefully carried out and the finished carbon must be free from foreign matters which are ordinarily found with the fibrous rice material; it must not have had too much of its cellulosic carbon consumed in the manufacture thereof, and it must not contain in its pores substantial quantities of either the caustic alkali nor of the acid which has been used in treating the same.

It is obvious that those skilled in the art may vary the details of the procedure constituting the process, without departing from the spirit of the invention, and therefore it is not desired to be limited to the above disclosure except as may be required by the claims.

What is claimed is:

1. The process of producing a decolorizing carbon from fibrous rice material, which consists in carbonizing said material in a furnace chamber at a temperature sufficient to effect a destructive distillation; feeding to said chamber a quantity of air insufficient to consume a material proportion of the cellulosic carbon present but insufficient to maintain the temperature needed to carbonize the material; collecting the char thus produced and treating the same with a solution of caustic alkali to remove a material proportion of the silica present, substantially as described.

2. The process of producing a decolorizing carbon from fibrous rice material which consists in carbonizing said material at a temperature sufficient to effect a destructive distillation and in the presence of a quantity of air insufficient to cause a serious loss of the carbon present but insufficient to maintain the temperature needed to carbonize the material; collecting the carbon thus produced; treating said carbon with an alkali to remove a substantial portion of the silica present; and removing the alkali from the product, substantially as described.

3. The process of producing a decolorizing carbon from fibrous rice material which consists in separating out from said material any foreign matter that may be present; carbonizing said material at a temperature sufficient to effect a destructive distillation and in the presence of a quantity of air insufficient to cause a serious loss of the carbon present but insufficient to maintain the temperature needed to carbonize the material; collecting the carbon thus produced; treating said carbon with an alkali to remove a substantial portion of the silica present; and removing the alkali from the product, substantially as described.

4. The process of producing a decolorizing carbon from fibrous rice material which consists in feeding said material to a furnace chamber at a predetermined rate; carbonizing said material at a temperature sufficient to effect a destructive distillation and in the presence of a quantity of air insufficient to cause a serious loss of the carbon present but insufficient to maintain the temperature needed to carbonize the material; collecting the carbon thus produced; treating said carbon with an alkali to remove a substantial portion of the silica present; and removing the alkali from the product, substantially as described.

5. The process of producing a decolorizing carbon from fibrous rice material which consists in preheating said material to eliminate a large percentage of its contained moisture; carbonizing said material at a temperature sufficient to effect a destructive distillation and in the presence of a quantity of air insufficient to cause a serious loss of the carbon present but insufficient to maintain the temperature needed to carbonize the material; collecting the carbon thus produced; treating said carbon with an alkali to remove a substantial portion of the silica present; and removing the alkali from the product, substantially as described.

6. The process of producing a decolorizing carbon from fibrous rice material containing a substantial percentage of rice hulls, which consists in separating from said material any foreign matter present; feeding said material at a regulated rate to a preheating furnace to eliminate the moisture present; feeding the dried material at a regulated rate into a furnace chamber; carbonizing said material at a temperature sufficient to effect a destructive distillation and in the presence of a quantity of air insufficient to cause a serious loss of the carbon present but insufficient to maintain the temperature needed to carbonize the material; collecting the carbon thus produced; treating said carbon with an alkali to remove a substantial portion of the silica present; and removing the alkali from the product, substantially as described.

7. The process of producing a decolorizing carbon which consists in carbonizing rice hulls at a temperature sufficient to effect a destructive distillation of said hulls and in the presence of a quantity of air insufficient to destroy a material proportion of the carbon present but insufficient to maintain the temperature needed to carbonize the material; dissolving out a substantial proportion of the silica present; and reheating the carbon thus obtained to drive off any volatile foreign matter that may be present, substantially as described.

8. The process of producing a decolorizing carbon which consists in carbonizing rice hulls at a temperature sufficient to effect a destructive distillation of said hulls and in the presence of a quantity of air insufficient to destroy a material proportion of the carbon present but insufficient to maintain the temperature needed to carbonize the material; dissolving out a substantial proportion of the silica present in the caustic alkali solution; treating the resulting carbon with acid; and reheating the carbon thus obtained to drive off any volatile foreign matter that may be present, substantially as described.

9. The process of producing a decolorizing carbon which consists in carbonizing rice hulls; treating said carbonized hulls with a caustic alkali solution to dissolve out a portion of the silica present; treating the carbon thus obtained with an acid; and reheating the resulting carbon to drive off any volatile matter present, substantially as described.

10. The process of producing a decolorizing carbon which consists in carbonizing rice hulls; grinding the char thus produced; treating said carbonized hulls with a caustic alkali solution for a time sufficient to dissolve out a substantial portion of the silica present; treating the carbon thus obtained with an acid for a time sufficient to neutralize any alkali present; and reheating the resulting carbon to drive off any volatile matter present, substantially as described.

In testimony whereof I affix my signature.

CHRISTIAN J. GAMBEL.